US008623942B2

(12) United States Patent
Kaneko et al.

(10) Patent No.: US 8,623,942 B2
(45) Date of Patent: Jan. 7, 2014

(54) EPOXY RESIN COMPOSITION, CURING AGENT, AND CURING ACCELERATOR

(75) Inventors: Masami Kaneko, Ichihara (JP); Kazuo Ono, Ichihara (JP); Natsuki Amanokura, Ichihara (JP); Naoyuki Kamegaya, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 87 days.

(21) Appl. No.: 13/138,568

(22) PCT Filed: Mar. 9, 2010

(86) PCT No.: PCT/JP2010/001663

§ 371 (c)(1),
(2), (4) Date: Sep. 6, 2011

(87) PCT Pub. No.: WO2010/103809

PCT Pub. Date: Sep. 16, 2010

(65) Prior Publication Data

US 2012/0004349 A1 Jan. 5, 2012

(30) Foreign Application Priority Data

Mar. 11, 2009 (JP) ................................ 2009-058265
Mar. 19, 2009 (JP) ................................ 2009-068405
Mar. 19, 2009 (JP) ................................ 2009-068416
Mar. 19, 2009 (JP) ................................ 2009-068786

(51) Int. Cl.

| | |
|---|---|
| ***C08L 63/00*** | (2006.01) |
| ***C07D 213/02*** | (2006.01) |
| ***C07D 233/54*** | (2006.01) |
| *C08G 59/40* | (2006.01) |
| *C08G 59/68* | (2006.01) |

(52) U.S. Cl.

USPC ............... 523/461; 523/455; 523/456; 546/1; 546/290; 546/304; 546/314; 546/329; 546/339; 546/348; 548/335.1; 548/335.5; 548/336.1; 548/341.1; 548/341.5; 548/342.5; 548/343.1; 548/343.5; 548/346.1

(58) Field of Classification Search

USPC ............. 523/400, 455, 456, 461; 546/1, 290, 546/304, 314, 329, 339, 348; 548/335.1, 548/335.5, 336.1, 341.1, 341.5, 342.5, 548/343.1, 343.5, 346.1

See application file for complete search history.

(56) References Cited

U.S. PATENT DOCUMENTS

| | | | | |
|---|---|---|---|---|
| 3,746,686 | A | 7/1973 | Marshall et al. | |
| 3,847,612 | A | 11/1974 | Winslow | |
| 4,244,989 | A | 1/1981 | Noomen | |
| 4,420,605 | A | 12/1983 | Kaufman | |
| 5,153,239 | A | 10/1992 | Kitagawa et al. | |
| 6,727,325 | B1 | 4/2004 | Suzuki et al. | |
| 2003/0008991 | A1 | 1/2003 | Holmes et al. | |
| 2003/0054146 | A1 | 3/2003 | Kim et al. | |
| 2010/0016475 | A1 | 1/2010 | Doering et al. | |
| 2010/0022744 | A1 | 1/2010 | Kaneko et al. | |
| 2010/0179250 | A1 | 7/2010 | Ono et al. | |
| 2012/0004349 | A1 | 1/2012 | Kaneko et al. | |
| 2012/0196991 | A1 * | 8/2012 | Ono et al. | 525/529 |
| 2013/0059942 | A1 * | 3/2013 | Ono et al. | 523/400 |
| 2013/0158231 | A1 * | 6/2013 | Kamegaya et al. | 528/408 |

FOREIGN PATENT DOCUMENTS

| | | | |
|---|---|---|---|
| EP | 0 057 325 | A1 | 8/1982 |
| EP | 0 621 256 | A1 | 10/1994 |
| EP | 0 949 286 | A1 | 10/1999 |
| JP | 49-032999 | A | 3/1974 |
| JP | 56-100748 | A | 8/1981 |
| JP | 57-135870 | A | 8/1982 |
| JP | 58-076420 | A | 5/1983 |
| JP | 60-252620 | A | 12/1985 |
| JP | 01-096278 | A | 4/1989 |
| JP | 4-2638 | B2 | 1/1992 |
| JP | 04-266922 | A | 9/1992 |
| JP | 05-194711 | A | 8/1993 |
| JP | 06-100662 | A | 4/1994 |
| JP | 08-151372 | A | 6/1996 |
| JP | 09-143250 | A | 6/1997 |
| JP | 10-511718 | A | 11/1998 |
| JP | 10-316639 | A | 12/1998 |
| JP | 10-324826 | A | 12/1998 |
| JP | 11-071449 | A | 3/1999 |
| JP | 11-158253 | A | 6/1999 |
| JP | 2000-248053 | A | 9/2000 |
| JP | 2001-172225 | A | 6/2001 |
| JP | 2002-020714 | A | 1/2002 |
| JP | 2002-047337 | A | 2/2002 |
| JP | 2004-503632 | A | 2/2004 |

(Continued)

OTHER PUBLICATIONS

Final Office Action dated Jun. 14, 2013 in copending U.S. Appl. No. 12/733,462.

International Search Report dated Jun. 15, 2010, in PCT/JP2010/001663, 2 pages.

Chen et al., "Synthesis, structures of cobalt/copper complexes and magnetic property of copper complex with the mixed ligands 5-nitro-1,3-benzenedicarbmlic acid and imidazole," Inorganic Chemistry Communications, 2006, 9:300-303.

(Continued)

*Primary Examiner* — Michael J Feely
(74) *Attorney, Agent, or Firm* — Foley & Lardner LLP

(57) ABSTRACT

The present invention provides a liquid curable epoxy resin composition that has excellent storage stability and curing properties and provides a cured product having excellent properties, particularly, excellent organic solvent resistance. For that purpose, a clathrate containing a carboxylic acid compound and at least one selected from the group consisting of an imidazole compound represented by formula (I), wherein $R_1$ to $R_4$ each represent a hydrogen atom or the like, and 1,8-diazabicyclo[5.4.0]undecene-7 (DBU) is mixed in an epoxy resin. The liquid curable epoxy resin composition uses a liquid epoxy resin or an organic solvent.

10 Claims, No Drawings

(56) References Cited

FOREIGN PATENT DOCUMENTS

| | | | |
|---|---|---|---|
| JP | 2004-210677 A | | 7/2004 |
| JP | 2004-300041 A | | 10/2004 |
| JP | 2004-300256 A | | 10/2004 |
| JP | 2004-307545 A | | 11/2004 |
| JP | 2006-016542 A | | 1/2006 |
| JP | 2006-206731 A | | 8/2006 |
| JP | 2007-039449 A | | 2/2007 |
| TW | 200909467 A | | 3/2009 |
| WO | WO 96/20253 A1 | | 7/1996 |
| WO | WO 2006/128542 A1 | | 12/2006 |
| WO | WO 2008/075427 A1 | | 6/2008 |
| WO | WO 2008/143314 A1 | | 11/2008 |
| WO | WO 2009037862 A1 | * | 3/2009 |

OTHER PUBLICATIONS

Lin et al., "Aromatic Polyoxyalkylene Amidoamines as Curatives for Epoxy Resins—Derivatives from t-Butyl Isophthalic Acid," Journal of Polymer Research, Apr. 1996, 3(2):97-104.

Luo et al., "A Novel Bilayer Cobalt(II)—Organic Framework with Nanoscale Channels Accommodating Large Organic Molecules," Inorganic Chemistry, 2003, 42:4486-4488.

Office Action dated Feb. 1, 2013 in copending U.S. Appl. No. 12/733,462.

It Final Office Action dated Sep. 7, 2012 in copending U.S. Appl. No. 12/733,462.

Office Action dated Sep. 24, 2013, in copending U.S. Appl. No. 13/331,772.

* cited by examiner

EPOXY RESIN COMPOSITION, CURING AGENT, AND CURING ACCELERATOR

CROSS-REFERENCE TO RELATED APPLICATIONS

This application is a National Stage application of PCT/JP2010/001663, filed Mar. 9, 2010, which claims priority from Japanese Application Nos. JP 2009-058265, filed Mar. 11, 2009, JP 2009-068405, filed Mar. 19, 2009, JP 2009-068786, filed Mar. 19, 2009, and JP 2009-068416, filed Mar. 19, 2009.

TECHNICAL FIELD

The present invention relates to a liquid curable epoxy resin composition having excellent storage properties and curability, particularly to a one-component, liquid type curable epoxy resin composition, and also to a curing agent and a curing accelerator preferred for liquid curable epoxy resin composition.

This application claims priority to Japanese Patent Application No. 2009-058265 filed on Mar. 11, 2009, Japanese Patent Application No. 2009-068405 filed on Mar. 19, 2009, Japanese Patent Application No. 2009-068416 filed on Mar. 19, 2009, and Japanese Patent Application No. 2009-068786 filed on Mar. 19, 2009, the content of which is incorporated herein.

BACKGROUND ART

Epoxy resins have excellent mechanical properties and thermal properties, and therefore are widely used in various fields. Imidazole is used as a curing agent for curing such epoxy resins. But, a problem of an epoxy resin-imidazole mixed liquid is that it cannot be used as a one-component type because curing starts early and it is thickened or gelled in long-term storage.

Accordingly, the use of an imidazole acid addition salt in which hydroxybenzoic, acid is added to imidazole, as the curing agent (see Patent Document 1), and the use of a clathrate of a tetrakisphenol compound (for example, 1,1,2,2-tetrakis(4-hydroxyphenyl)ethane (hereinafter referred to as TEP)) and imidazole as the curing agent (see Patent Document 2) are proposed. Particularly, Patent Document 3 proposes an epoxy resin-based, organic solvent type paint using xylene for a clathrate of TEP and 2-ethyl-4-methylimidazole. This achieves a certain effect, but is not satisfactory yet. Particularly, storage stability with a polar solvent that is a good solvent is insufficient.

The present inventors propose a curable resin composition using a clathrate of an isophthalic acid compound and imidazole (see Patent Document 4). But, this does not describe storage stability or curability for use as a liquid curable epoxy composition.

In addition, Patent Document 5 describes a one-component epoxy resin composition containing a salt consisting of 2 moles of an imidazole compound having a long-chain alkyl group at position 2 and 1 mole of an aliphatic dicarboxylic acid, as a curing agent and a curing accelerator, which can also be cured in a low temperature range and also has excellent storage stability. But, the clathrate used in the invention has an aliphatic polyvalent carboxylic acid (host compound): guest compound inclusion ratio of 1:1, and Patent Document 5 describes the tensile shear strength of the cured product, but does not describe the organic solvent resistance of the cured product.

Patent Document 6 describes a liquid epoxy resin composition consisting of a salt of pyromellitic acid and an imidazole or an imidazoline. Patent Document 7 describes a liquid epoxy resin composition consisting of a salt of a hydroxyalkylated imidazole and an organic acid, particularly pyromellitic acid. But, although the cured products have excellent heat resistance or moisture resistance, Patent Documents 6 and 7 do not describe organic solvent resistance.

PRIOR ART DOCUMENTS

Patent Documents

Patent Document 1: Japanese Patent Publication No. 4-2638

Patent Document 2: Japanese Unexamined Patent Application Publication No. 11-71449

Patent Document 3: Japanese Unexamined Patent Application Publication No. 10-324826

Patent Document 4: International Publication No. WO2008/075427

Patent Document 5: Japanese Unexamined Patent Application Publication No. 9-143250

Patent Document 6: Japanese Unexamined Patent Application Publication No. 11-158253

Patent Document 7: Japanese Unexamined Patent Application Publication No. 2000-248053

SUMMARY OF THE INVENTION

Object to be Solved by the Invention

The epoxy resin of a solvent-based paint is generally used, dissolved in an organic solvent. Specifically, the epoxy resin is dissolved in an organic solvent, such as an aromatic solvent, such as toluene or xylene, an alcohol solvent, such as butanol, a ketone solvent, such as methyl isobutyl ketone, an ester solvent, such as ethyl acetate or butyl acetate, or a mixed solvent thereof for preparation. When an imidazole compound is mixed in this solvent-based paint as a curing catalyst, a drawback is that a reaction proceeds gradually, even at room temperature, immediately after the mixing. In this manner, in a liquid curable epoxy resin composition, the reaction of an imidazole compound that is a curing agent or a curing accelerator with the epoxy resin occurs early, and the storage stability is low.

It is an object of the present invention to provide a curable epoxy resin composition that has excellent storage stability and curing properties and provides a cured product having excellent properties, particularly, excellent organic solvent resistance, in a liquid epoxy resin composition, that is, an epoxy resin composition containing an organic solvent, or a composition containing a liquid epoxy resin as a base resin. The present invention aims to provide an epoxy resin composition preferred for one-component liquid paints, adhesives, sealing materials, casting agents, and electronic materials such as liquid sealants and the like.

Means to Solve the Object

The present inventors have studied diligently to solve the above object, and, as a result, found that the above object can be solved when a clathrate comprising a carboxylic acid compound and an imidazole compound or 1,8-diazabicyclo[5.4.0]undecene-7 is used as a curing agent and/or a curing accelerator for an epoxy resin, thereby leading to the completion of the present invention.

Specifically, the present invention relates to (1) a liquid curable epoxy resin composition containing the following component (A) and component (B):

(A) an epoxy resin; and (B) a clathrate containing (b1) at least one compound selected from the group consisting of a carboxylic acid compound, 4,4',4"-trihydroxytriphenylmethane, tris(2-hydroxyethyl) isocyanurate, 2,2',4,4'-tetrahydroxybenzophenone, and a pyridine derivative represented by formula (I):

(I)

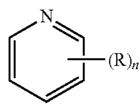

wherein R represents a hydroxy group, a nitro group, an alkyl group, an alkoxy group, an amino group, a sulfo group, an acetamide group, a hydrazine group, or a carboxyl group, and n represents an integer of 1 to 5; and when there are a plurality of R, R may be the same or different, and (b2) at least one selected from the group consisting of an imidazole compound represented by formula (II):

(II)

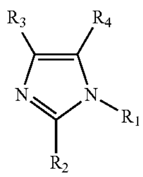

wherein $R_1$ represents a hydrogen atom, a C1-C10 alkyl group, a phenyl group, an aryl group, or an alkylaryl group, and $R_2$ to $R_4$ each represent a hydrogen atom, a nitro group, a halogen atom, a C1-C20 alkyl group, a C1-C20 alkyl group substituted by a hydroxy group, an aryl group, an alkylaryl group, or a C1-C20 acyl group, and 1,8-diazabicyclo[5.4.0]undecene-7, (2) the curable epoxy resin composition according to the above (1), further containing an organic solvent, (3) the curable epoxy resin composition according to the above (2), wherein when methyl ethyl ketone is saturated with the clathrate of the component (B) at 25° C., a concentration of the component (b2) liberated in the methyl ethyl ketone is 5000 ppm or less, (4) the curable epoxy resin composition according to the above (2) or (3), wherein the organic solvent is a polar solvent, and (5) the curable epoxy resin composition according to the above (1), wherein the epoxy resin is a liquid epoxy resin.

In addition, the present invention relates to (6) a curing agent or a curing-accelerator for a liquid curable resin composition, containing the following clathrate (B):

(B) a clathrate containing (b1) at least one compound selected from the group consisting of a carboxylic acid compound, 4,4',4"-trihydroxytriphenylmethane, tris(2-hydroxyethyl) isocyanurate, 2,2',4,4'-tetrahydroxybenzophenone, and a pyridine derivative represented by formula (I):

(I)

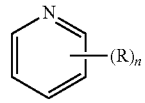

wherein R represents a hydroxy group, a nitro group, an alkyl group, an alkoxy group, an amino group, a sulfo group, an acetamide group, a hydrazine group, or a carboxyl group, and n represents an integer of 1 to 5; and when there are a plurality of R, R may be the same or different, and (b2) at least one selected from the group consisting of an imidazole compound represented by formula (II):

(II)

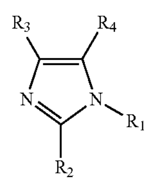

wherein $R_1$ represents a hydrogen atom, a C1-C10 alkyl group, an aryl group, an arylalkyl group, or a cyanoethyl group, and $R_2$ to $R_4$ each represent a hydrogen atom, a nitro group, a halogen atom, a C1-C20 alkyl group, a C1-C20 alkyl group substituted by a hydroxy group, an aryl group, an arylalkyl group, or a C1-C20 acyl group, and 1,8-diazabicyclo[5.4.0]undecene-7, (7) the curing agent or the curing accelerator according to the above (6), wherein the liquid curable resin composition comprises an organic solvent, and (8) the curing agent or the curing accelerator according to the above (6), wherein the liquid curable resin composition comprises a liquid epoxy resin.

MODE OF CARRYING OUT THE INVENTION

The liquid curable epoxy resin composition of the present invention contains at least the following component (A) and component (B):

(A) an epoxy resin; and (B) a clathrate containing (b1) at least one compound selected from the group consisting of a carboxylic acid compound, 4,4',4"-trihydroxytriphenylmethane, tris(2-hydroxyethyl) isocyanurate, 2,2',4,4'-tetrahydroxybenzophenone, and pyridine derivative represented by formula (I):

(I)

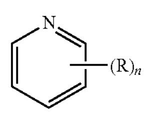

wherein R represents a hydroxy group, a nitro group, an alkyl group, an alkoxy group, an amino group, a sulfo group, an acetamide group, a hydrazine group, or a carboxyl group, and n represents an integer of 1 to 5; and when there are a plurality of R, R may be the same or different, and (b2) at least one selected from the group consisting of an imidazole compound represented by formula (I):

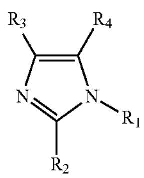

wherein $R_1$ represents a hydrogen atom, a C1-C10 alkyl group, a phenyl group, a benzyl group, or a cyanoethyl group, and $R_2$ to $R_4$ each represent a hydrogen atom, a nitro group, a halogen atom, a C1-C20 alkyl group, a phenyl group, a benzyl group, or a C1-C20 acyl group, and 1,8-diazabicyclo[5.4.0]undecene-7 (hereinafter referred to as DBU).

The liquid curable epoxy resin composition of the present invention may contain no organic solvent when the epoxy resin of the component (A) is liquid, but it contains an organic solvent when the epoxy resin of the component (A) is not liquid.

1) Clathrate

The "clathrate" of the present invention refers to a compound in which two or three or more molecules are bonded to each other via a bond other than a covalent bond, more preferably, a crystalline compound in which two or three or more molecules are bonded to each other via a bond other than a covalent bond. An including compound is referred to as a host compound, and an included compound is referred to as a guest compound. In addition, the clathrate as used herein also comprises salts.

In the present invention, the compound of (b1) is a host compound, and the imidazole compound and/or DBU of (b2) is a guest compound. In addition, the clathrate of the present invention may comprise a third component, such as a solvent.

The proportion of the compound of (b1) and the imidazole compound and/or DBU of (b2) is not particularly limited as long as a clathrate can be formed. But, the imidazole compound and/or DBU is preferably 0.1 to 5.0 moles, more preferably 0.5 to 4.0 moles, with respect to 1 mole of the compound of (b1).

When the clathrate of the present invention contains a third component, the third component is preferably 40 mol % or less, further preferably 10 mol % or less, with respect to the total amount of the clathrate. Particularly, the clathrate of the present invention most preferably comprises no third component.

(Host Compound)

The host compound is at least one compound selected from the group consisting of a carboxylic acid compound, 4,4',4"-trihydroxytriphenylmethane, tris(2-hydroxyethyl) isocyanurate, 2,2',4,4'-tetrahydroxybenzophenone, and a pyridine derivative represented by the above formula (I).

Examples of the carboxylic acid compound of (b1) that is the host compound can include aromatic carboxylic acids and aliphatic polyvalent carboxylic acids.

Examples of the aromatic carboxylic acids can include isophthalic acid, isophthalic acid derivatives represented by the following formula (III):

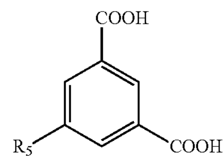

wherein $R_5$ represents a C1-C6 alkyl group, a C1-C6 alkoxy group, a nitro group, or a hydroxy group, (for example, 5-t-butylisophthalic acid, 5-hydroxyisophthalic acid, and 5-nitroisophthalic acid), 3,5-dihydroxybenzoic acid, terephthalic acid, trimellitic acid, trimesic acid, pyromellitic acid, 2,6-naphthalenedicarboxylic acid, 1,4-naphthalenedicarboxylic acid, 3,5-dihydroxy-2-naphthoic acid, 3,7-dihydroxy-2-naphthoic acid, and 4,4'-benzophenonedicarboxylic acid. Aromatic carboxylic acids having 2 to 4 carboxyl groups and 6 to 20 carbon atoms (not comprising the carbon atoms of the carboxyl groups) are preferred. One of these carboxylic acid compounds may be used alone, or two or more of these carboxylic acid compounds may be used in combination.

Examples of the aliphatic polyvalent carboxylic acids can include fumaric acid, 1,3-cyclohexanedicarboxylic acid, trans-1,4-cyclohexanedicarboxylic acid, succinic acid, malonic acid, tartaric acid, maleic acid, citric acid, malic acid, and adipic acid. Aliphatic carboxylic acids or hydroxy aliphatic polyvalent carboxylic acids having 2 to 4 carboxyl groups and 2 to 10 carbon atoms (not comprising the carbon atoms of the carboxyl groups) are preferred. One of these carboxylic acid compounds may be used alone, or two or more of these carboxylic acid compounds may be used in combination.

In addition, in the pyridine derivative represented by formula (I) in (b1) that is the host compound, R represents a hydroxy group, a nitro group, an alkyl group, an alkoxy group, an amino group, a sulfo group, an acetamide group, a hydrazine group, or a carboxyl group. Here, the alkyl group, the alkoxy group, the amino group, or the acetamide group may have a substituent. Examples of the substituent can include an alkyl group, an alkoxy group, a hydroxy group, an aryl group, and an arylalkyl group. In addition, the alkyl group of the substituent may have a hydroxy group or a carboxyl group.

Here, examples of the alkyl group include C1-6 alkyl groups, such as a methyl group, an ethyl group, a n-propyl group, an i-propyl group, a n-butyl group, a s-butyl group, an i-butyl group, a t-butyl group, a n-pentyl group, and a n-hexyl group.

Examples of the alkoxy group include C1-6 alkoxy groups, such as a methoxy group, an ethoxy group, a n-propoxy group, an i-propoxy group, a n-butoxy group, a s-butoxy group, an i-butoxy group, and a t-butoxy group.

The aryl group means a monocyclic or polycyclic aryl group. Here, the polycyclic aryl group also includes partially saturated groups, in addition to completely unsaturated groups. Examples thereof include C6-10 aryl groups, such as a phenyl group, a naphthyl group, an azulenyl group, an indenyl group, an indanyl group, and a tetralinyl group.

The arylalkyl group is a group in which the above aryl group and alkyl group are bonded to each other. Examples of the arylalkyl group include C6-10 aryl C1-6 alkyl groups, such as a benzyl group, a phenethyl group, a 3-phenyl-n-propyl group, a 1-phenyl-n-hexyl group, a naphthalene-1-ylmethyl group, a naphthalene-2-ylethyl group, a 1-naphthalene-2-yl-n-propyl group, and an indene-1-ylmethyl group.

Specific examples of the pyridine derivative represented by formula (I) can include the following compounds:

2-hydroxypyridine, 3-hydroxypyridine, 4-hydroxypyridine, 2,3-dihydroxypyridine, 2,4-dihydroxypyridine, 2-hydroxy-3-nitropyridine, 2-hydroxy-5-nitropyridine, 3-hydroxy-2-nitropyridine, 4-hydroxy-3-nitropyridine, 2-amino-3-hydroxypyridine, 2-hydroxy-4-methylpyridine, 2-hydroxy-5-methylpyridine, 2-hydroxy-6-methylpyridine, 3-hydroxy-2-methylpyridine, nicotinic acid, isonicotinic acid, 2-hydroxynicotinic acid, 3-hydroxy-2-pyridinecarboxylic acid, 6-hydroxynicotinic acid, 2,6-dihydroxyisonicotinic acid, 2,6-dimethyl-3-hydroxypyridine, 3-hydroxy-6-methyl-2-pyridinemethanol, 2-hydroxy-6-methylnicotinic acid, 2-methoxynicotinic acid, 3-pyridinesulfonic acid, 4-hydroxy-3-pyridinesulfonic acid, 2-aminopyridine, 3-aminopyridine, 4-aminopyridine, 2-hydrazinopyridine, 2-acetamidepyridine, 2-(2-pyridylamino)ethanol, N-(2-pyridyl)-β-alanine, 2,5-diaminopyridine, 2,6-diaminopyridine, 3,4-diaminopyridine, 2-aminonicotinic acid, 4-aminonicotinic acid, 6-aminonicotinic acid, 6-methylnicotinic acid, 2-pyridinemethanol, 3-pyridinemethanol, 4-pyridinemethanol, 2-pyridinecarboxylic acid, 2,3-pyridinedicarboxylic acid, 2,5-pyridinedicarboxylic acid, 3,4-pyridinedicarboxylic acid, 3,5-pyridinedicarboxylic acid, nicotinamide, and 2-pyridineethanol.

The pyridine derivative represented by formula (I) is particularly preferably a pyridine derivative represented by general formula (IV):

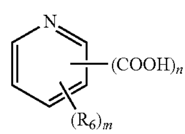

(IV)

wherein $R_6$ represents a carboxyl group or a hydroxy group, m represents an integer of any of 0 to 4, and n represents 1 or 2; and when there are a plurality of $R_6$, $R_6$ may be the same or different. Specific examples thereof can include 2,3-pyridinedicarboxylic acid, 2,6-pyridinedicarboxylic acid, 3-hydroxy-2-pyridinecarboxylic acid, and 2,6-dihydroxyisonicotinic acid.

(Guest Compound)

(b2) that is the guest compound is an imidazole compound represented by formula (II) and/or DBU. The imidazole compound of formula (II) is not particularly limited as long as it is a compound represented by:

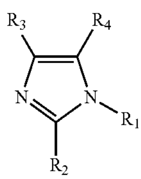

(II)

wherein $R_1$ represents a hydrogen atom, a C1-C10 alkyl group, an aryl group, an arylalkyl group, or a cyanoethyl group, and $R_2$ to $R_4$ each represent a hydrogen atom, a nitro group, a halogen atom, a C1-C20 alkyl group, a C1-C20 alkyl group substituted by a hydroxy group, an aryl group, an arylalkyl group, or a C1-C20 acyl group.

Examples of the C1-C10 alkyl group of $R_1$ include a methyl group, an ethyl group, a propyl group, an isopropyl group, a cyclopropyl group, a butyl group, an isobutyl group, an s-butyl group, a t-butyl group, a cyclobutyl group, a cyclopropylmethyl group, a pentyl group, an isopentyl group, a 2-methylbutyl group, a neopentyl group, a 1-ethylpropyl group, a hexyl group, an isohexyl group, a 4-methylpentyl group, a 3-methylpentyl group, a 2-methylpentyl group, a 1-methylpentyl group, a 3,3-dimethylbutyl group, a 2,2-dimethylbutyl group, a 1,1-dimethylbutyl group, a 1,2-dimethylbutyl group, a 1,3-dimethylbutyl group, a 2,3-dimethylbutyl group, a 1-ethylbutyl group, a 2-ethylbutyl group, an octyl group, a nonyl group, and a decyl group.

Examples of the C1-C20 alkyl group of $R_2$ to $R_4$ include, in addition to those mentioned as the alkyl group of $R_1$, an undecyl group, a lauryl group, a palmityl group, and a stearyl group.

Examples of the C1-C20 alkyl group substituted by a hydroxy group in $R_2$ to $R_4$ include a hydroxymethyl group or a hydroxyethyl group.

Examples of the C1-C20 acyl group of $R_2$ to $R_4$ include a formyl group, an acetyl group, a propionyl group, a butyryl group, an isobutyryl group, a valeryl group, a pivaloyl group, a hexanoyl group, an octanoyl group, a decanoyl group, a lauroyl group, a myristoyl group, a palmitoyl group, and a stearoyl group.

The aryl group of $R_2$ to $R_4$ means a monocyclic or polycyclic aryl group. Here, the polycyclic aryl group also includes partially saturated groups, in addition to completely unsaturated groups. Examples thereof include C6-10 aryl groups, such as a phenyl group, a naphthyl group, an azulenyl group, an indenyl group, an indanyl group, and a tetralinyl group.

The arylalkyl group of $R_2$ to $R_4$ is a group in which the above aryl group and alkyl group are bonded to each other. Examples of the arylalkyl group include C6-10 aryl C1-6 alkyl groups, such as a benzyl group, a phenethyl group, a 3-phenyl-n-propyl group, a 1-phenyl-n-hexyl group, a naphthalene-1-ylmethyl group, a naphthalene-2-ylethyl group, a 1-naphthalene-2-yl-n-propyl group, and an indene-1-ylmethyl group.

Specific examples of the imidazole compound include imidazole, 1-methylimidazole, 2-methylimidazole, 3-methylimidazole, 4-methylimidazole, 5-methylimidazole, 1-ethylimidazole, 2-ethylimidazole, 3-ethylimidazole, 4-ethylimidazole, 5-ethylimidazole, 1-n-propylimidazole, 2-n-propylimidazole, 1-isopropylimidazole, 2-isopropylimidazole, 1-n-butylimidazole, 2-n-butylimidazole, 1-isobutylimidazole, 2-isobutylimidazole, 2-undecyl-1H-imidazole, 2-heptadecyl-1H-imidazole, 1,2-dimethylimidazole, 1,3-dimethylimidazole, 2,4-dimethylimidazole, 2-ethyl-4-methylimidazole, 1-phenylimidazole, 2-phenyl-1H-imidazole, 4-methyl-2-phenyl-1H-imidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4,5-dihydroxymethylimidazole, 2-phenyl-4-methyl-5-hydroxymethylimidazole, and 1-cyanoethyl-2-phenyl-4,5-di(2-cyanoethoxy)methylimidazole.

Among these, an imidazole compound that is at least one selected from the group consisting of 2-methylimidazole, 2-ethyl-4-methylimidazole, 2-undecylimidazole, and 2-phenyl-4-methyl-5-hydroxymethylimidazole is more preferred.

The combination of the clathrate of the compound of (b1) and (b2) the imidazole compound and/or DBU described above is not particularly limited as long as it is in the above range.

(Method for Producing Clathrate)

In a method for producing a clathrate, a clathrate can be obtained by directly mixing, or mixing in a solvent, the compound of (b1) and the imidazole compound and/or DBU of (b2).

When a solvent is used, a clathrate can be obtained by adding the above host compound and guest compound to the solvent, then subjecting the mixture to heating treatment or heating to reflux treatment, while stirring the mixture as required, and then precipitating the clathrate.

In addition, when the imidazole compound and/or DBU of (b2) is a substance having a low boiling point or a substance having high vapor pressure, the intended clathrate can be obtained by allowing the vapor of these substances to act on the compound of (b1). In addition, clathrate consisting of multiple components, three or more components, can also be obtained by reacting two or more types of the compounds of (b2) with the compound of (b1). Further, the intended clathrate can also be obtained by first producing a clathrate of the compound of (b1) and a compound of (b2), and reacting this clathrate with another compound of (b2) by the method as described above.

The structure of the obtained clathrate can be confirmed by thermal analysis (TG and DTA), an infrared absorption spectrum (IR), an X-ray diffraction pattern, a solid-state NMR spectrum, and the like. In addition, the composition of the clathrate can be confirmed by thermal analysis, a $^1$H-NMR spectrum, high performance liquid chromatography (HPLC), elementary analysis, and the like.

2) Liquid Curable Epoxy Resin Composition

The liquid curable epoxy resin composition of the present invention is characterized by containing the clathrate that is the component (B). The composition includes a solvent type composition containing an organic solvent, and a liquid type composition containing a liquid epoxy resin as a base resin.

In a one-component liquid curable epoxy resin composition, the curing agent in the organic solvent or in the liquid epoxy resin as the base and the epoxy groups of the epoxy resin are in direct contact with each other even at low temperature, and therefore, a crosslinking reaction is extremely likely to occur, and therefore, its storage stability worsens. Even if a clathrate is used, the storage stability of the composition is affected when a large amount of the curing agent or the curing accelerator that is the guest component is released into the organic solvent or the liquid epoxy resin. In addition, during curing, such as after application, the guest compound, such as imidazole, is released from the clathrate by heating, and the curing reaction of the epoxy resin is started, and in this case, it is desired that the guest compound is rapidly released at suitable temperature, and the curing reaction proceeds quickly. The composition of the present invention, even a one-component liquid epoxy resin composition, has both excellent storage stability and curing properties. Particularly, a composition that has especially excellent storage stability and curing properties and provides a cured product having especially excellent properties, particularly, especially excellent organic solvent resistance, is obtained by using, as the clathrate that is the component (B) of the composition of the present invention, a clathrate in which when the clathrate is dissolved in methyl ethyl ketone for saturation (25° C.), the concentration of the guest compound, the component (b2), in the methyl ethyl ketone is 5000 ppm or less, preferably 1000 ppm or less, further preferably 500 ppm or less, more preferably 100 ppm or less, and particularly 10 ppm or less. Here, the methyl ethyl ketone is a solvent preferred for an organic solvent-based epoxy resin composition that dissolves the epoxy resin well and also has excellent application and drying properties.

For these reasons, the component (B) is more preferably a clathrate in which (b1) is at least one selected from the group consisting of 3,5-dihydroxybenzoic acid, 5-hydroxyisophthalic acid, isophthalic acid, terephthalic acid, 5-t-butylisophthalic acid, 5-nitroisophthalic acid, trimellitic acid, trimesic acid, pyromellitic acid, 2,6-naphthalenedicarboxylic acid, 1,4-naphthalenedicarboxylic acid, 3,5-dihydroxy-2-naphthoic acid, 3,7-dihydroxy-2-naphthoic acid, and 4,4'-benzophenonedicarboxylic acid, and (b2) is at least one selected from the group consisting of 2-methylimidazole, 2-ethyl-4-methylimidazole, 2-undecylimidazole, 2-phenyl-4-methyl-5-hydroxymethylimidazole, and DBU.

(Component (A): Epoxy Resin)

As the epoxy resin of the component (A), conventionally known various polyepoxy compounds can be used. Examples thereof can include aromatic glycidyl ether compounds, such as bis(4-hydroxyphenyl)propane diglycidyl ether, bis(4-hydroxy-3,5-dibromophenyl)propane diglycidyl ether, bis(4-hydroxyphenyl)ethane diglycidyl ether, bis(4-hydroxyphenyl)methane diglycidyl ether, resorcinol diglycidyl ether, phloroglucinol triglycidyl ether, trihydroxybiphenyl triglycidyl ether, tetraglycidylbenzophenone, bisresorcinol tetraglycidyl ether, tetramethylbisphenol A diglycidyl ether, bisphenol C diglycidyl ether, bisphenolhexafluoropropane diglycidyl ether, 1,3-bis[1-(2,3-epoxypropoxy)-1-trifluoromethyl-2,2,2-trifluoroethyl]benzene, 1,4-bis[1-(2,3-epoxypropoxy)-1-trifluoromethyl-2,2,2-trifluoromethyl]benzene, 4,4'-bis(2,3-epoxypropoxy)octafluorobiphenyl, and phenol novolak type bisepoxy compounds, alicyclic polyepoxy compounds, such as alicyclic diepoxy acetals, alicyclic diepoxy adipates, alicyclic diepoxy carboxylates, and vinylcyclohexene dioxide, glycidyl ester compounds, such as diglycidyl phthalate, diglycidyl tetrahydrophthalate, diglycidyl hexahydrophthalate, dimethylglycidyl phthalate, dimethylglycidyl hexahydrophthalate, diglycidyl-p-oxybenzoate, diglycidylcyclopentane-1,3-dicarboxylate, and glycidyl esters of dimer acids, glycidylamine compounds, such as diglycidylaniline, diglycidyltoluidine, triglycidylaminophenol, tetraglycidyldiaminodiphenylmethane, and diglycidyltribromoaniline, and heterocyclic epoxy compounds, such as diglycidylhydantoin, glycidylglycidoxyalkylhydantoin, and triglycidyl isocyanurate.

Examples of the liquid epoxy resin can include polyalkylene ether type epoxy compounds, such as (poly)ethylene glycol diglycidyl ether, (poly)propylene glycol diglycidyl ether, and trimethylolpropane triglycidyl ether, glycidyl ester type epoxy compounds, such as diglycidyl esters of dimer acids, diglycycidyl phthalate, and diglycidyl tetrahydrophthalate, and homopolymers of glycidyl (meth)acrylate, allyl glycidyl ether, or the like, or copolymers of the monomers and other soft unsaturated monomers. The soft unsaturated monomers are such that homopolymers thereof have a glass transition temperature of less than 60° C. Examples of the soft unsaturated monomers can include methyl acrylate, ethyl acrylate, butyl(meth)acrylate, isobutyl (meth)acrylate, 2-ethylhexyl(meth)acrylate, and lauryl methacrylate.

(Component (C): Organic Solvent)

The solvent used in the organic solvent type is one that is a good solvent for the epoxy resin. Examples of the solvent include alcohols, such as methanol, ethanol, propanol, and butanol, ethers, such as 2-methoxyethanol, ethylene glycol monoethyl ether, ethylene glycol monobutyl ether, diethylene glycol, diethylene glycol monoethyl ether, and diethylene glycol monobutyl ether, ketones, such as acetone, methyl ethyl ketone, 2-pentanone, 2-hexanone, methyl isobutyl ketone, isophorone, and cyclohexanone, esters, such as methyl acetate, ethyl acetate, propyl acetate, butyl acetate, isobutyl acetate, ethylene glycol monoethyl ether acetate, propylene glycol monomethyl ether acetate, and diethylene glycol monoethyl ether acetate, aromatic compounds, such as toluene and xylene, and mixed solvents of two or more thereof.

Particularly, polar solvents, such as ketones and esters, that have good epoxy resin solubility properties can be preferably used in the composition of the present invention.

(Curing Agent or Curing Accelerator)

In the liquid curable epoxy resin composition of the present invention, the clathrate of the component (B) is used as a curing agent or a curing accelerator, as described above. After the application of the curable epoxy resin composition of the present invention, the guest component that is a curing agent or a curing accelerator is rapidly released from the host component by being heated, and the released curing agent and the base resin undergo a crosslinking reaction, or the released curing accelerator acts as a curing catalyst for a curing agent and the base resin, and thus, a cured coating can be formed. The temperature at which the curing agent or the curing accelerator is released is different depending on the type of the guest of the curing agent or the catalyst, and the mixing proportion of the guest and the host, and therefore can be selected by appropriately determining the suitable conditions.

When the component (B) is a curing agent, the liquid curable epoxy resin composition of the present invention may further comprise a curing accelerator. When the component (B) is a curing accelerator, the liquid curable epoxy resin composition of the present invention may further comprise a curing agent.

The curing agent that may be contained, other than the component (B), is not particularly limited as long as it is a compound that reacts with the epoxy groups in the epoxy resin to cure the epoxy resin. Similarly, the curing accelerator that may be contained, other than the component (B), is not particularly limited as long as it is a compound that promotes the above curing reaction. As such a curing agent or curing accelerator, any can be selected from those commonly used as conventional curing agents or curing accelerators for epoxy resins, and used. Examples thereof include amine compounds, such as aliphatic amines, alicyclic and heterocyclic amines, aromatic amines, and modified amines, imidazole compounds, imidazoline compounds, amide compounds, ester compounds, phenol compounds, alcohol compounds, thiol compounds, ether compounds, thioether compounds, urea compounds, thiourea compounds, Lewis acid compounds, phosphorus compounds, acid anhydride compounds, onium salt compounds, and active silicon compound-aluminum complexes.

Specific examples of the curing agent or the curing accelerator include the following compounds.

Examples of the aliphatic amines include ethylenediamine, trimethylenediamine, triethylenediamine, tetramethylenediamine, hexamethylenediamine, diethylenetriamine, triethylenetetramine, tetraethylenepentamine, dipropylenediamine, dimethylaminopropylamine, diethylaminopropylamine, trimethylhexamethylenediamine, pentanediamine, bis(2-dimethylaminoethyl)ether, pentamethyldiethylenetriamine, alkyl-t-monoamine, 1,4-diazabicyclo(2,2,2)octane (triethylenediamine), N,N,N',N'-tetramethylhexamethylenediamine, N,N,N',N'-tetramethylpropylenediamine, N,N,N',N'-tetramethylethylenediamine, N,N-dimethylcyclohexylamine, dibutylaminopropylamine, dimethylaminoethoxyethoxyethanol, triethanolamine, and dimethylaminohexanol.

Examples of the alicyclic and heterocyclic amines include piperidine, piperazine, menthanediamine, isophoronediamine, methylmorpholine, ethylmorpholine, N,N',N"-tris(dimethylaminopropyl)hexahydro-s-triazine, a 3,9-bis(3-aminopropyl)-2,4,8,10-tetraoxyspiro(5,5)undecane adduct, N-aminoethylpiperazine, trimethylaminoethylpiperazine, bis(4-aminocyclohexyl)methane, N,N'-dimethylpiperazine, and 1,8-diazabicyclo[4.5.0]undecene-7.

Examples of the aromatic amines include o-phenylenediamine, m-phenylenediamine, p-phenylenediamine, diaminodiphenylmethane, diaminodiphenylsulfone, benzylmethylamine, dimethylbenzylamine, m-xylenediamine, pyridine, picoline, and α-methylbenzylmethylamine.

Examples of the modified amines include epoxy compound addition polyamines, Michael addition polyamines, Mannich addition polyamines, thiourea addition polyamines, ketone-blocked polyamines, dicyandiamide, guanidine, organic acid hydrazides, diaminomaleonitrile, aminimides, a boron trifluoride-piperidine complex, and a boron trifluoride-monoethylamine complex.

Examples of the imidazole compounds include imidazole, 1-methylimidazole, 2-methylimidazole, 3-methylimidazole, 4-methylimidazole, 5-methylimidazole, 1-ethylimidazole, 2-ethylimidazole, 3-ethylimidazole, 4-ethylimidazole, 5-ethylimidazole, 1-n-propylimidazole, 2-n-propylimidazole, 1-isopropylimidazole, 2-isopropylimidazole, 1-n-butylimidazole, 2-n-butylimidazole, 1-isobutylimidazole, 2-isobutylimidazole, 2-undecyl-1H-imidazole, 2-heptadecyl-1H-imidazole, 1,2-dimethylimidazole, 1,3-dimethylimidazole, 2,4-dimethylimidazole, 2-ethyl-4-methylimidazole, 1-phenylimidazole, 2-phenyl-1H-imidazole, 4-methyl-2-phenyl-1H-imidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, a 2-phenylimidazole isocyanuric acid adduct, a 2-methylimidazole isocyanuric acid adduct, 2-phenyl-4,5-dihydroxymethylimidazole, 2-phenyl-4-methyl-5-hydroxymethylimidazole, 1-cyanoethyl-2-phenyl-4,5-di(2-cyanoethoxy)methylimidazole, 1-dodecyl-2-methyl-3-benzylimidazolium chloride, and 1-benzyl-2-phenylimidazole hydrochloride.

Examples of the imidazoline compounds include 2-methylimidazoline and 2-phenylimidazoline.

Examples of the amide compounds include polyamides obtained by the condensation of dimer acids and polyamines.

Examples of the ester compounds include active carbonyl compounds, such as aryl and thioaryl esters of carboxylic acids.

For the phenol compounds, the alcohol compounds, the thiol compounds, the ether compounds, and the thioether compounds, examples of phenolic resin curing agents include aralkyl type phenolic resins, such as phenol aralkyl resins and naphthol aralkyl resins, novolak type phenolic resins, such as phenol novolak resins and cresol novolak resins, modified resins thereof, for example, epoxidized or butylated novolak type phenolic resins, dicyclopentadiene-modified phenolic resins, paraxylene-modified phenolic resins, triphenolalkane type phenolic resins, and polyfunctional phenolic resins. In addition, examples of the above compounds include polyol, polymercaptan, polysulfide, 2-(dimethylaminomethylphenol), 2,4,6-tris(dimethylaminomethyl)phenol, and the tri-2-ethylhexyl hydrochloride of 2,4,6-tris(dimethylaminomethyl)phenol.

Examples of the urea compounds, the thiourea compounds, and the Lewis acid compounds include butylated urea, butylated melamine, butylated thiourea, and boron trifluoride.

Examples of the phosphorus compounds include organic phosphine compounds, for example, primary phosphines, such as alkylphosphines, such as ethylphosphine and butylphosphine, and phenylphosphine; secondary phosphines, such as dialkylphosphines, such as dimethylphosphine and dipropylphosphine, diphenylphosphine, and methylethylphosphine; and tertiary phosphines, such as trimethylphosphine, triethylphosphine, and triphenylphosphine.

Examples of the acid anhydride compounds include phthalic anhydride, tetrahydrophthalic anhydride, hexahydrophthalic anhydride, methyltetrahydrophthalic anhydride, methylhexahydrophthalic anhydride, endomethylenetetrahydrophthalic anhydride, methylendomethylenetetrahydrophthalic anhydride, maleic anhydride, tetramethylenemaleic anhydride, trimellitic anhydride, chlorendic anhydride, pyromellitic anhydride, dodecenylsuccinic anhydride, benzophenonetetracarboxylic anhydride, ethylene glycol bis(anhydrotrimellitate), glycerol tris(anhydrotrimellitate), methylcyclohexenetetracarboxylic anhydride, and polyazelaic anhydride.

Examples of the onium salt compounds and the active silicon compound-aluminum complexes include aryldiazonium salts, diaryliodonium salts, triarylsulfonium salts, a triphenylsilanol-aluminum complex, a triphenylmethoxysilane-aluminum complex, a silyl peroxide-aluminum complex, and a triphenylsilanol-tris(salicylaldehydato)aluminum complex.

Particularly, amine compounds, imidazole compounds, and phenol compounds are preferably used as the above curing agent or curing accelerator. Among phenol compounds, phenolic resin curing agents are more preferably used.

The amount of the clathrate used can be similar to the amount of a usual curing agent or curing accelerator used, and is different depending on the curing method. In the case of an addition type curing agent that reacts with epoxy groups and thus the curing agent molecules are always incorporated into the cured resin, the clathrate is usually used so that the included imidazole compound (the curing agent and/or the curing accelerator) is about 0.1 to 1.0 mole with respect to 1 mole of epoxy groups, though also depending on the required properties of the resin. In the case of a polymerization type curing agent or a photoinitiation type curing agent that catalytically induces the ring opening of epoxy groups, without the curing agent molecules being incorporated into the resin, to cause a polymerization addition reaction between oligomers, the case of use as a curing accelerator, and the like, 1.0 mole or less of the clathrate with respect to 1 mole of epoxy groups is sufficient. One of these clathrates can be used, or two or more of these clathrates can be mixed and used.

The average particle diameter D50 of the clathrate is not particularly limited, and is usually in the range of about 0.01 to 80 μm, preferably about 0.01 to 30 μm.

(Other Additives)

Other additives can be added to the epoxy resin composition of the present invention, as desired. Examples of other additives include silane coupling agents, such as vinyltrimethoxysilane, vinyltriethoxysilane, γ-glycidoxypropyltrimethoxysilane, γ-glycidoxypropyltriethoxysilane, γ-methacryloxypropyltrimethoxysilane, γ-methacryloxypropyltriethoxysilane, γ-aminopropyltrimethoxysilane, γ-aminopropyltriethoxysilane, N-β(aminoethyl)γ-aminopropyltrimethoxysilane, N-β(aminoethyl)γ-aminopropyltriethoxysilane, N-phenyl-γ-aminopropyltrimethoxysilane, N-phenyl-γ-aminopropyltriethoxysilane, γ-mercaptopropyltrimethoxysilane, and γ-mercaptopropyltriethoxysilane; fillers, such as calcium bicarbonate, light calcium carbonate, natural silica, synthetic silica, fused silica, kaolin, clay, titanium oxide, barium sulfate, zinc oxide, aluminum hydroxide, magnesium hydroxide, talc, mica, wollastonite, potassium titanate, aluminum borate, sepiolite, and xonotlite; elastomer modifiers, such as NBRs, polybutadienes, chloroprene rubbers, silicones, crosslinked NBRs, crosslinked BRs, acrylics, core-shell acrylics, urethane rubbers, polyester elastomers, functional group-containing liquid NBRs, liquid polybutadienes, liquid polyesters, liquid polysulfides, modified silicones, and urethane prepolymers;

flame retardants, such as hexabromocyclodecane, bis(dibromopropyl)tetrabromobisphenol A, tris(dibromopropyl) isocyanurate, tris(tribromoneopentyl) phosphate, decabromodiphenyl oxide, bis(pentabromo)phenylethane, tris(tribromophenoxy)triazine, ethylenebistetrabromophthalimide, polybromophenylindan, brominated polystyrene, tetrabromobisphenol A polycarbonate, brominated phenylene ethylene oxide, polypentabromobenzyl acrylate, triphenyl phosphate, tricresyl phosphate, trixynyl phosphate, cresyl diphenyl phosphate, xylyl diphenyl phosphate, cresyl bis(di-2,6-xylenyl) phosphate, 2-ethylhexyl diphenyl phosphate, resorcinol bis(diphenyl) phosphate, bisphenol A bis(diphenyl) phosphate, bisphenol A bis(dicresyl) phosphate, resorcinol bis(di-2,6-xylenyl) phosphate, tris(chloroethyl) phosphate, tris(chloropropyl) phosphate, tris(dichloropropyl) phosphate, tris(tribromopropyl) phosphate, diethyl-N,N-bis (2-hydroxyethyl)aminomethyl phosphonate, oxalate anion-treated aluminum hydroxide, nitrate-treated aluminum hydroxide, high temperature hot water-treated aluminum hydroxide, stannic acid surface-treated hydrated metal compounds, nickel compound surface-treated magnesium hydroxide, silicone polymer surface-treated magnesium hydroxide, phlogopite, multilayer surface-treated hydrated metal compounds, and cation polymer-treated magnesium hydroxide; engineering plastics, such as high density polyethylene, polypropylene, polystyrene, polymethyl methacrylate, polyvinyl chloride, nylon 6,6, polyacetal, polyethersulfone, polyetherimide, polybutylene terephthalate, polyetheretherketone, polycarbonate, and polysulfone; plasticizers; diluents, such as n-butyl glycidyl ether, phenyl glycidyl ether, styrene oxide, t-butylphenyl glycidyl ether, dicyclopentadiene diepoxide, phenol, cresol, and t-butylphenol; extenders; reinforcing agents; colorants; thickening agents; and release agents, such as higher fatty acids, higher fatty acid esters, and higher fatty acid calcium, for example, carnauba wax and polyethylene wax. The amount of these additives mixed is not particularly limited, and can be appropriately determined within limits in which the effect of the present invention is obtained.

Further, the epoxy resin composition of the present invention may contain, in addition to the epoxy resin, other resins. Examples of other resins include polyester resins, acrylic resins, silicon resins, and polyurethane resins.

In using the epoxy resin composition of the present invention for a use for an organic solvent-based paint, a known filler, pigment, colorant, flowability-adjusting agent, anti-crawling agent, and the like can be mixed as required, and coating can be performed by a coating method, such as spray coating, brush coating, roller coating, or flow coating. The film thickness is 1 to 300 μm, preferably 10 to 100 μm.

Concrete, wood, paper, plastic, metal, or the like can be appropriately used as the substrate.

EXAMPLES

Examples will be shown below, but the present invention is not restricted to these Examples in any way.

Preparation of Clathrates

Reference Example 1

Cases where the (b1) Compound was an Aromatic Carboxylic Acid

Equal moles of a carboxylic acid compound of (b1) and an imidazole compound of (b2) in the following Table 1, and a solvent were added to a three-neck flask and stirred. Then, the mixed liquid was heated to reflux. After completion, the mixed liquid was allowed to stand overnight. The mixed liquid allowed to stand overnight was filtered, followed by vacuum drying, to obtain a clathrate (catalyst samples Nos. 1 to 19).

The results are shown in Table 1. Inclusion was confirmed by $^{1}$H-NMR, TG-DTA, and XRD.

(Test)

In addition, the concentration of imidazole dissolved in methyl ethyl ketone (MEK) is shown in Table 1.

The dissolved concentration was measured as follows.

A suitable amount of a sample was added to 4 ml of MEK, and the mixture was shaken at 25° C. The sample was added until the sample was not dissolved. The sample liquid was filtered by a 0.2 μm filter, and the imidazole concentration (mg/L) in the solution was obtained by HPLC. (analysis column: Finepak SIL C18S manufactured by JASCO Corporation, mobile phase: aqueous sodium phosphate solution/methanol=60/40; aqueous ammonium carbonate solution/methanol=60/40 for Comparison 4; analysis column: Capcell Pak AQ manufactured by Shiseido Company, Limited, mobile phase: aqueous sodium phosphate solution/methanol=60/40 for sample 3)

TABLE 1

| Catalyst sample No. | (b1) Compound | (b2) Compound | Inclusion ratio (H/G) | Imidazole concentration ppm |
|---|---|---|---|---|
| 1 | 5-Hydroxyisophthalic acid | 2MZ | 1/1 | 100.43 |
| 2 | 5-t-Butylisophthalic acid | 2MZ | 1/1 | 467.17 |
| 3 | 5-Nitroisophthalic acid | 2MZ | 1/2 | 15.58 |
| 4 | Trimesic acid | 2MZ | 1/1 | 1.33 |
| Comparison 1 | — | 2MZ | — | 43372.45 |
| Comparison 2 | TEP | 2MZ | 1/2 | 6519.13 |
| 5 | 3,5-Dihydroxybenzoic acid | 2E4MZ | 1/1 | 749.57 |
| 6 | 5-Hydroxyisophthalic acid | 2E4MZ | 1/1 | 34.90 |
| 7 | 5-t-Butylisophthalic acid | 2E4MZ | 1/1 | 57.81 |
| 8 | 5-Nitroisophthalic acid | 2E4MZ | 1/1 | 30.16 |
| 9 | Trimellitic acid | 2E4MZ | 1/1 | 52.58 |
| 10 | Trimesic acid | 2E4MZ | 1/1 | 7.59 |
| 11 | Pyromellitic acid | 2E4MZ | 1/2 | 1.11 |
| 12 | 2,6-Naphthalenedicarboxylic acid | 2E4MZ | 1/1 | 437.31 |
| 13 | 1,4-Naphthalenedicarboxylic acid | 2E4MZ | 1/1 | 9.54 |
| 14 | 3,5-Dihydroxy-2-naphthoic acid | 2E4MZ | 1/1 | 811.16 |
| 15 | 3,7-Dihydroxy-2-naphthoic acid | 2E4MZ | 1/1 | 2730.92 |
| 16 | 4,4'-Benzophenonedicarboxylic acid | 2E4MZ | 2/3 | 198.64 |
| Comparison 3 | — | 2E4MZ | — | 638662.5 |
| Comparison 4 | TEP | 2E4MZ | 1/2 | 2967.04 |
| 17 | 5-Hydroxyisophthalic acid | 2P4MHZ | 1/1 | 8.10 |
| 18 | 5-t-Butylisophthalic acid | 2P4MHZ | 1/1 | 8.05 |
| 19 | 5-Nitroisophthalic acid | 2P4MHZ | 1/1 | 0.02 |

H/G: host/guest

2MZ: 2-methylimidazole

2E4MZ: 2-ethyl-4-methylimidazole

2P4MHZ: 2-phenyl-4-methyl-5-hydroxymethylimidazole

TEP: 1,1,2,2-tetrakis(4-hydroxyphenyl)ethane

Reference Example 2

Examples in which the (b1) Compound was an Aliphatic Polyvalent Carboxylic Acid

Reference Example 2-1

Fumaric acid (17.41 g, 150 mmol) and 2-methylimidazole (2MZ 12.32 g, 150 mmol) were mixed in 150 ml of methanol. The mixture was stirred and heated to reflux. Then, the heating was stopped for cooling. The mixture was allowed to cool overnight at room temperature, and then, precipitated crystals were filtered and vacuum-dried. It was confirmed by $^{1}$H-NMR, TG-DTA, and XRD that the obtained fumaric acid-2MZ clathrate was a clathrate having an inclusion ratio of 1:1 (catalyst sample No. 20). Catalyst samples Nos. 22 to 25, and 29 to 31 were synthesized by a similar method. Catalyst sample No. 27 was synthesized by a similar method, except that ethyl acetate was used instead of methanol. Catalyst samples Nos. 21, 26, 28, 33, and 35 to 40 were synthesized by a similar method, except that acetone was used instead of methanol. In addition, catalyst sample No. 35 was similarly synthesized with a mixed solvent of 100 ml of acetone and 10 ml of methanol. The results are shown in Table 2.

Reference Example 2-2

Adipic acid (21.92 g, 150 mmol) was dispersed in 150 ml of acetone, and a solution of 2E4MZ (16.52 g, 150 mmol) in 75 ml of acetone was dropped. After the completion of the dropping, the mixture was stirred for 3 hours, while being heated to reflux. Then, the mixture was cooled to room temperature, and precipitated crystals were filtered and vacuum-dried. It was confirmed by $^{1}$H-NMR, TG-DTA, and XRD that the obtained adipic acid-2E4MZ clathrate was a clathrate having an inclusion ratio of 1:1 (catalyst sample No. 32). Catalyst samples Nos. 29 and 31 were similarly synthesized, changing acetone to methanol. The results are shown in Table 2.

TABLE 2

| Catalyst sample No. | (b1) Compound | (b2) Compound | Inclusion ratio (H/G) |
|---|---|---|---|
| 20 | Fumaric acid | 2MZ | 1/1 |
| 21 | 1,3-Cyclohexanedicarboxylic acid | 2MZ | 1/1 |
| 22 | Trans-1,4-cyclohexanedicarboxylic acid | 2MZ | 1/1 |
| 23 | Succinic acid | 2MZ | 1/1 |
| 24 | Malonic acid | 2MZ | 1/1 |
| 25 | Tartaric acid | 2MZ | 1/1 |
| 26 | Maleic acid | 2MZ | 1/1 |
| 27 | Malic acid | 2MZ | 1/1 |
| 28 | Adipic acid | 2MZ | 1/1 |
| 29 | Trans-1,4-cyclohexanedicarboxylic acid | 2E4MZ | 1/1 |
| 30 | Succinic acid | 2E4MZ | 1/1 |
| 31 | Tartaric acid | 2E4MZ | 1/1 |
| 32 | Adipic acid | 2E4MZ | 1/1 |
| 33 | 1,3-Cyclohexanedicarboxylic acid | 2P4MHZ | 1/1 |
| 34 | Malonic acid | 2P4MH | 1/1 |
| 35 | Maleic acid | 2P4MH | 1/1 |
| 36 | Citric acid | 2P4MH | 1/1 |
| 37 | 1,3-Cyclohexanedicarboxylic acid | DBU | 1/1 |
| 38 | Trans-1,4-cyclohexanedicarboxylic acid | DBU | 1/1 |

TABLE 2-continued

| Catalyst sample No. | (b1) Compound | (b2) Compound | Inclusion ratio (H/G) |
|---|---|---|---|
| 39 | Tartaric acid | DBU | 1/1 |
| 40 | Adipic acid | DBU | 1/1 |

DBU: 1,8-diazabicyclo[5.4.0]undecene-7

(Test)

For the clathrates of catalyst samples Nos. 20, 21, 22, 25, and 28, the concentration of imidazole dissolved in methyl ethyl ketone (MEK) is shown in Table 3. According to this, it is seen that the clathrates of the present invention have lower concentration, compared with the cases of TEP and without inclusion, and are preferred for a one-component epoxy resin composition for which storage stability is required.

The dissolved concentration was measured as follows.

A suitable amount of a sample was added to 4 ml of MEK, and the mixture was shaken at 25° C. The sample was added until the sample was not dissolved. The sample liquid was filtered by a 0.2 μm filter, and the imidazole concentration (mg/L) in the solution was obtained by HPLC. (analysis column: Finepak SIL C18S manufactured by JASCO Corporation, mobile phase: aqueous sodium phosphate solution/methanol=60/40)

The results are shown in Table 3.

TABLE 3

| Catalyst sample No. | (b1) Compound | (b2) Compound | Imidazole concentration (ppm) | Imidazole content (%) |
|---|---|---|---|---|
| 20 | Fumaric acid | 2MZ | 1.67 | 41.4 |
| 21 | 1,3-Cyclohexane-dicarboxylic acid | 2MZ | 598.97 | 32.3 |
| 22 | Trans-1,4-cyclohexane-dicarboxylic acid | 2MZ | 59.55 | 32.3 |
| 25 | Tartaric acid | 2MZ | 0.32 | 35.4 |
| 28 | Adipic acid | 2MZ | 1024.71 | 36.0 |
| Comparison | TEP | 2MZ | 6519.13 | 29.2 |
| Comparison | — | 2MZ | 43372.45 | 100 |

Reference Example 3

Examples in which the (b1) Compound was a Pyridine Derivative

Reference Example 3-1

2,3-Pyridinedicarboxylic acid (4 g, 23.9 mmol) and 2-methylimidazole (2MZ 1.96 g, 23.9 mmol) were mixed in 30 ml of an ethyl acetate solution. The mixture was stirred and heated to reflux. Then, the heating was stopped for cooling. The mixture was allowed to cool overnight at room temperature, and then, precipitated crystals were filtered and vacuum-dried. It was confirmed by $^{1}$H-NMR, TG-DTA, and XRD that the obtained 2,3-pyridinedicarboxylic acid-2MZ clathrate was a clathrate having an inclusion ratio of 1:1 (catalyst sample No. 41).

Examples 41 to 45, 49, 52, 53, and 54 to 60 were synthesized by a similar method. The results are shown in Table 4.

Reference Example 3-2

Examples 50 and 51 were synthesized by a method similar to synthesis method 1, except that methanol was used for the solvent, instead of ethyl acetate. The results are shown in Table 4.

Reference Example 3-3

A suitable amount of acetone was added to 2,6-pyridinedicarboxylic acid (12.06 g, 72.2 mmol) and 2-ethyl-4-methylimidazole (2E4MZ 3.96 g, 35.9 mmol), and the mixture was mixed in a mortar. A powder obtained by the volatilization of the acetone was vacuum-dried. It was confirmed by $^{1}$H-NMR, TG-DTA, and XRD that the obtained 2,6-pyridinedicarboxylic acid-2E4MZ clathrate was a clathrate having an inclusion ratio of 2:1 (catalyst sample No. 46).

Catalyst sample No. 47 was synthesized by a similar method. The results are shown in Table 4.

Reference Example 3-4

1,1,2,2-Tetrakis(4-hydroxyphenyl)ethane (TEP: 66.67 g, 167 mmol) was dispersed in 1600 ml of ethyl acetate, and the dispersion was heated to reflux. A solution of DBU (25.42 g, 167 mmol) in ethyl acetate was dropped under reflux. After the completion of the dropping, the mixture was stirred with reflux for 3 hours. Then, the mixture was cooled to room temperature, and precipitated crystals were filtered and vacuum-dried at 80° C. It was confirmed by $^{1}$H-NMR, TG-DTA, and XRD that the obtained TEP-DBU clathrate was a clathrate having an inclusion ratio of 1:1. Catalyst sample No. 48 was similarly synthesized, except that ethyl acetate was changed to methanol. The results are shown in Table 4.

TABLE 4

| Catalyst sample No. | (b1) Compound | (b2) Compound | Inclusion ratio (H/G) |
|---|---|---|---|
| 41 | 2,3-Pyridinedicarboxylic acid | 2MZ | 1/1 |
| 42 | 2,6-Pyridinedicarboxylic acid | 2MZ | 1/1 |
| 43 | 3-Hydroxy-2-pyridinecarboxylic acid | 2MZ | 1/1 |
| 44 | 2,6-Dihydroxyisonicotinic acid | 2MZ | 2/1 |
| 45 | 2,3-Pyridinedicarboxylic acid | 2E4MZ | 2/1 |
| 46 | 2,6-Pyridinedicarboxylic acid | 2E4MZ | 2/1 |
| 47 | 3-Hydroxy-2-pyridinecarboxylic acid | 2E4MZ | 2/1 |
| 48 | 2,6-Dihydroxyisonicotinic acid | 2E4MZ | 2/1 |
| 49 | 2,3-Pyridinedicarboxylic acid | 2P4MHZ | 1/1 |
| 50 | 2,6-Pyridinedicarboxylic acid | 2P4MHZ | 1/1 |
| 51 | 3-Hydroxy-2-pyridinecarboxylic acid | 2P4MH | 2/1 |
| 52 | 2,6-Dihydroxyisonicotinic acid | 2P4MHZ | 1/1 |
| 53 | 2,3-Pyridinedicarboxylic acid | C11Im | 1/1 |
| 54 | 2,6-Pyridinedicarboxylic acid | C11Im | 1/1 |
| 55 | 3-Hydroxy-2-pyridinecarboxylic acid | C11Im | 2/1 |

TABLE 4-continued

| Catalyst sample No. | (b1) Compound | (b2) Compound | Inclusion ratio (H/G) |
|---|---|---|---|
| 56 | 2,6-Dihydroxyisonicotinic acid | C11Im | 1/1 |
| 57 | 2,3-Pyridinedicarboxylic acid | DBU | 1/1 |
| 58 | 2,6-Pyridinedicarboxylic acid | DBU | 1/1 |
| 59 | 3-Hydroxy-2-pyridinecarboxylic acid | DBU | 1/1 |
| 60 | 2,6-Dihydroxyisonicotinic acid | DBU | 3/2 |

C11Im: 2-undecylimidazole (Test)

For the clathrates of catalyst sample No. 42 and catalyst sample No. 44, the concentration of imidazole dissolved in methyl ethyl ketone (MEK) is shown in Table 5. According to this, it is seen that the clathrates of the present invention have extremely lower concentration, compared with the cases of TEP and without inclusion, and are preferred for a one-component epoxy resin composition for which storage stability is required.

The dissolved concentration was measured as follows.

A suitable amount of a sample was added to 4 ml of MEK, and the mixture was shaken at 25° C. The sample was added until the sample was not dissolved. The sample liquid was filtered by a 0.2 μm filter, and the imidazole concentration (mg/L) in the solution was obtained by HPLC. (analysis column: Finepak SIL C18S manufactured by JASCO Corporation, mobile phase: aqueous sodium phosphate solution/methanol=60/40)

TABLE 5

| Catalyst sample No. | (b1) Compound | (b2) Compound | Imidazole concentration (ppm) | Imidazole content (%) |
|---|---|---|---|---|
| 42 | 2,6-Pyridine-dicarboxylic acid | 2MZ | 7.50 | 32.9 |
| 44 | 2,6-Dihydroxy-isonicotinic acid | 2MZ | 1.13 | 20.9 |
| Comparison | TEP | 2MZ | 6519.13 | 29.2 |
| Comparison | — | 2MZ | 43372.45 | 100 |

Reference Example 4

Examples in which the (b2) Compound was 4,4',4"-trihydroxytriphenylmethane, tris(2-hydroxyethyl) isocyanurate, or 2,2',4,4'-tetrahydroxybenzophenone Reference Example 4-1

4,4',4"-Trihydroxytriphenylmethane (4 g, 13.7 mmol) and 2-methylimidazole (2MZ 1.12 g, 13.7 mmol) were mixed in 30 ml of an ethyl acetate solution. The mixture was stirred and heated to reflux. Then, the heating was stopped for cooling. The mixture was allowed to cool overnight at room temperature, and then, precipitated crystals were filtered and vacuum-dried. It was confirmed by $^{1}$H-NMR, TG-DTA, and XRD that the obtained 4,4',4"-trihydroxytriphenylmethane-2MZ clathrate was a clathrate having an inclusion ratio of 1:1 (catalyst sample No. 61).

Catalyst samples Nos. 64 to 66 were synthesized by a similar method. The results are shown in Table 6.

Reference Example 4-2

A suitable amount of acetone was added to tris(2-hydroxyethyl) isocyanurate (4 g, 15.3 mmol) and 2-methylimidazole (2MZ 1.26 g, 15.3 mmol), and the mixture was mixed in a mortar. A powder obtained by the volatilization of the acetone was vacuum-dried. It was confirmed by $^1$H-NMR, TG-DTA, and XRD that the obtained tris(2-hydroxyethyl) isocyanurate-2E4MZ clathrate was a clathrate having an inclusion ratio of 1:1 (catalyst sample No. 62). The result is shown in Table 6.

Reference Example 4-3

4,4',4"-Trihydroxytriphenylmethane (45 g, 154 mmol) was added to 90 ml of ethyl acetate, and the mixture was heated to reflux. A solution of 2-ethyl-4-methylimidazole (2E4MZ 17.0 g, 154 mmol) in ethyl acetate was dropped under reflux. After the completion of the dropping, the mixture was stirred with reflux for 3 hours. Then, the mixture was cooled to room temperature, and precipitated crystals were filtered and vacuum-dried at 80° C. It was confirmed by $^1$H-NMR, TG-DTA, and XRD that the obtained 4,4',4"-trihydroxytriphenylmethane-2E4MZ clathrate was a clathrate having an inclusion ratio of 1:1 (catalyst sample No. 63). In addition, catalyst sample No. 67 was similarly synthesized, changing ethyl acetate to methanol. The results are shown in Table 6.

TABLE 6

| Catalyst sample No. | (b1) Compound | (b2) Compound | Inclusion ratio (H/G) |
|---|---|---|---|
| 61 | 4,4',4",-Trihydroxytriphenylmethane | 2MZ | 1/1 |
| 62 | Tris(2-hydroxyethyl) isocyanurate | 2MZ | 1/1 |
| 63 | 4,4',4",-Trihydroxytriphenylmethane | 2E4MZ | 1/1 |
| 64 | 2,2',4,4'-Tetrahydroxybenzophenone | 2E4MZ | 1/2 |
| 65 | Tris(2-hydroxyethyl) isocyanurate | C11Im | 2/1 |
| 66 | 2,2',4,4'-Tetrahydroxybenzophenone | C11Im | 1/2 |
| 67 | 4,4',4",-Trihydroxytriphenylmethane | DBU | 1/1 |

(Test)

For the clathrate of catalyst sample No. 62, the concentration of imidazole dissolved in methyl ethyl ketone (MEK) is shown in Table 7. According to this, it is seen that the clathrate of the present invention has lower concentration, compared with the cases of TEP and without inclusion, and is preferred for a one-component epoxy resin composition for which storage stability is required.

The dissolved concentration was measured as follows.

A suitable amount of a sample was added to 4 ml of MEK, and the mixture was shaken at 25° C. The sample was added until the sample was not dissolved. The sample liquid was filtered by a 0.2 μm filter, and the imidazole concentration (mg/L) in the solution was obtained by HPLC. (analysis column: Finepak SIL C18S manufactured by JASCO Corporation, mobile phase: aqueous sodium phosphate solution/methanol=60/40)

TABLE 7

| Catalyst sample No. | (b1) Compound | (b2) Compound | Imidazole concentration (ppm) | Imidazole content (%) |
|---|---|---|---|---|
| 62 | 2,6-Pyridine-dicarboxylic acid | 2MZ | 5269.13 | 23.9 |
| Comparison | TEP | 2MZ | 6519.13 | 29.2 |
| Comparison | — | 2MZ | 43372.45 | 100 |

2) Preparation of Liquid Curable Epoxy Resins

2-1) Examples in which an Organic Solvent was Used

Example 1

An Example in which the (b1) Compound was an Aromatic Carboxylic Acid 10 g of an epoxy resin Epotohto YD-128 (manufactured by Tohto Kasei Co., Ltd, epoxy equivalent: 184 to 194 g/eq) and 10 g of MEK were mixed and stirred. 3.514 g of catalyst sample 1 was mixed in the mixture to obtain a curable epoxy resin composition. The composition was stored at 30° C., and its storage stability was observed. The result is shown in Table 8.

Examples 2 to 6 and Comparative Examples 1 to 4

Epoxy resin compositions were obtained as in Example 1, using catalyst samples 2, 3, 6, 7, and 8. In addition, Epoxy resin compositions were obtained as in Example 1, using the compounds in Comparisons 1 to 4 as a curing catalyst. The results are shown in Table 8. According to this, it is seen that the one-component epoxy resin compositions of the present invention using MEK as a solvent have far superior storage stability (gelation in change over time), compared with the TEP clathrates.

TABLE 8

| Example | Catalyst sample No. | Imidazole content % | Amount added g | Change over time |
|---|---|---|---|---|
| 1 | 1 | 31.07 | 3.514 | No gelation in 20 days |
| 2 | 2 | 26.98 | 4.047 | Gelation in 11 days |
| 3 | 3 | 43.75 | 2.469 | No gelation in 20 days |
| Comparative Example 1 | Comparison 1 | 100 | 1.09 | Gelation in 3 days |
| Comparative Example 2 | Comparison 2 | 29.18 | 3.741 | Gelation in 6 days |
| 4 | 6 | 37.69 | 3.887 | No gelation in 20 days |
| 5 | 7 | 33.14 | 4.420 | No gelation in 20 days |
| 6 | 8 | 34.29 | 4.272 | No gelation in 20 days |
| Comparative Example 3 | Comparison 3 | 100 | 1.464 | Gelation in 5 days |

TABLE 8-continued

| Example | Catalyst sample No. | Imidazole content % | Amount added g | Change over time |
|---|---|---|---|---|
| Comparative Example 4 | Comparison 4 | 35.61 | 4.114 | Gelation in 11 days |

Epoxy Resin Curability of Stored Liquids

Test Example

The solutions in Examples 1, 2, and 3 were stored at 30° C. for 7 days, then applied to soda-lime glass, using a bar coater (No. 50: target film thickness: 114.5 μm for a wet film), and dried at 180° C. for 30 minutes. The tackiness and MEK resistance at the time were evaluated. For the MEK resistance, Kimwipe S200 was impregnated with MEK, the test glass was rubbed with it back and forth 10 times, and the appearance was observed. The results are shown in Table 9. According to the results, it is seen that even the compositions after storage have good epoxy curability.

TABLE 9

| Test Example | Tackiness (stickiness) | MEK resistance |
|---|---|---|
| 1 | No | No abnormality |
| 2 | No | No abnormality |
| 3 | No | No abnormality |

2-2) Examples in which a Liquid Epoxy Resin was Used

Examples 7 to 58 and Comparative Examples 5 to 9

A predetermined amount of each catalyst sample was added to 10 g of a liquid epoxy resin Epotohto YD-128 (manufactured by Tohto Kasei Co., Ltd, epoxy equivalent: 184 to 194 g/eq) and mixed to obtain a curable epoxy resin composition. The composition was stored at 40° C., and its storage stability was observed. The results are shown in Tables 10 to 12.

TABLE 10

(Cases where (b2) was 2MZ)

| | (b1) Compound in catalyst sample | Imidazole content (%) | Amount added g to 10 g of epoxy | Appearance Initial stage | Color | Change over time |
|---|---|---|---|---|---|---|
| Example 7 | NIPA | 43.73 | 2.502 | Dispersion | White | Solidification in 10 to 14 days |
| 8 | HIPA | 31.06 | 3.523 | Dispersion | White | Solidification in 10 to 14 days |
| 9 | BIPA | 26.98 | 4.047 | Dispersion | White | Solidification in 9 days |
| 10 | 3,5-Dihydroxybenzoic acid | 34.73 | 3.151 | Dispersion | Gray | Solidification in 9 to 18 days |
| 11 | Isophthalic acid | 33.05 | 3.311 | Dispersion | White | Solidification in 9 to 19 days |
| 12 | Pyromellitic acid | 24.39 | 4.486 | Dispersion | White | Solidification in 79 days |
| 13 | Fumaric acid | 41.40 | 2.643 | Dispersion | White to yellow (after 18 to 21 days) | Solidification in 25 days |
| 14 | 1,4-Naphthalenedicarboxylic acid | 27.50 | 3.979 | Dispersion | White | Solidification in 7 days |
| 15 | 2,6-Naphthalenedicarboxylic acid | 27.50 | 3.979 | Dispersion | White | Solidification in 7 days |
| 16 | Trimesic acid | 28.07 | 3.899 | Dispersion | White | Solidification in 25 to 28 days |
| 17 | Trimellitic acid | 28.07 | 3.899 | Dispersion | White | Solidifidation in 11 to 17 days |
| 18 | 1,3-Cyclohexanedicarboxylic acid | 32.26 | 3.392 | Dispersion | White | Solidification in 3 to 8 days |
| 19 | Malic acid | 37.95 | 2.884 | Dispersion | White | Solidification in 41 days |
| 20 | Adipic acid | 35.94 | 3.045 | Dispersion | White | Solidification in 3 to 8 days |
| 21 | 4,4'-Benzophenonedicarboxylic | 23.28 | 4.701 | Dispersion | White | Solidification in 3 to 8 days |

TABLE 10-continued (Cases where (b2) was 2MZ)

| | (b1) Compound in catalyst sample | Imidazole content (%) | Amount added g to 10 g of epoxy | Appearance Initial stage | Color | Change over time |
|---|---|---|---|---|---|---|
| 22 | Maleic acid | 41.4 | 2.643 | Dispersion | White | Solidification in 3 to 8 days |
| 23 | Succinic acid | 40.98 | 2.67 | Dispersion | White | Solidification in 14 days |
| 24 | 3,7-Dihydroxy-2-naphthoic acid | 28.65 | 3.819 | Dispersion | Yellow | Solidification in 8 days |
| 25 | Trans-1,4-cyclohexanedicarboxylic acid | 32.26 | 3.392 | Dispersion | White | Solidification in 14 days |
| 26 | Terephthalic acid | 33.05 | 3.311 | Dispersion | White | Solidification in 14 days |
| 27 | Malonic acid | 44.07 | 2.483 | Dispersion | White | Solidification in 14 days |
| 28 | Tartaric acid | 35.33 | 3.097 | Dispersion | White | Solidification in 42 days |
| Comparative Example 5 | 2MZ | 100 | 1.094 | Dispersion | Yellow | Solidification in 1 day |
| Comparative Example 6 | TEP-2MZ | 29.18 | 3.750 | Dispersion | White | Solidification in 4 days |

NIPA: 5-nitroisophthalic acid
HIPA: 5-hydroxyisophthalic acid
BIPA: 5-t-butylisophthalic acid

TABLE 11

(Cases where (b2) was 2P4MHZ)

| | (b1) Compound in catalyst sample | Imidazole content ( % ) | Amount added to 10 g of epoxy | Appearance Initial stage | Color | Change over time |
|---|---|---|---|---|---|---|
| Example 29 | NIPA | 64.05 | 3.917 | Dispersion | White until 4th day, yellow in 5 days | Solidification in 9 to 11 days |
| 30 | HIPA | 50.79 | 4.940 | Dispersion | White | Solidification in 21 to 22 days |
| 31 | BIPA | 45.85 | 5.472 | Dispersion | White | Solidification in 15 days |
| 32 | 3,5-Dihydroxybenzoic acid | 64.66 | 3.880 | Dispersion | White until 11th day, pink in 12 days | Solidification in 13 days |
| 33 | Isophthalic acid | 69.36 | 3.617 | Dispersion | White until 18th day, yellow in 19 days | Solidification in 21 to 22 days |
| 34 | Pyromellitic acid | 59.67 | 4.205 | Dispersion | White until 26th day, yellow in 27 to 32 days | Solidification in 33 to 34 days |
| 35 | Fumaric acid | 69.36 | 3.617 | Dispersion | White until 8th day, yellow | Solidification in 13 days |

TABLE 11-continued

| (Cases where (b2) was 2P4MHZ) | | | | | | |
|---|---|---|---|---|---|---|
| | (b1) Compound in catalyst sample | Imidazole content (%) | Amount added to 10 g of epoxy | Appearance Initial stage | Color | Change over time |
| | | | | | in 11 days | |
| 36 | 1,4-Naphthalene dicarboxylic acid | 63.49 | 3.952 | Dispersion | White until 4th day, pink in 5 days | Solidification in 16 to 18 days |
| 37 | 2,6-Naphthalene dicarboxylic acid | 63.49 | 3.952 | Dispersion | White until 13th day, yellow in 14 days | Solidification in 15 days |
| 38 | Trimesic acid | 47.22 | 5.313 | Dispersion | White | Solidification in 27 to 32 days |
| 39 | Trimellitic acid | 47.22 | 5.313 | Dispersion | White | Solidification in 9 to 11 days |
| 40 | Malic acid | 58.37 | 4.298 | Dispersion | White until 20th day, yellow in 21 to 22 days | Solidification in 23 to 25 days |
| 41 | 3,5-Dihydroxy-2-naphthoic acid | 47.94 | 5.234 | Dispersion | Ocher | Solidification in 9 to 11 days |
| 42 | Maleic acid | 61.83 | 4.058 | Dispersion | White until 0th day, pink in 1 day | Solidification in 27 to 32 days |
| 43 | Terephthalic acid | 53.09 | 4.726 | Dispersion | White | Solidification in 27 to 32 days |
| 44 | Malonic acid | 64.37 | 3.898 | Dispersion | Yellow | Solidification in 15 days |
| 45 | Citric acid | 49.46 | 5.073 | Dispersion | White | Solidification in 14 days |
| 46 | 2,3-Pyridinedic arboxylic acid | 52.05 | 4.820 | Dispersion | White until 4th day, yellow in 5 days | Solidification in 13 days |
| 47 | 2,6-Pyridinedic arboxylic acid | 52.05 | 4.820 | Dispersion | White until 15th day, orange in 16 to 18 days | Solidification in 19 days |
| 48 | 2,6-Dihydroxyis onicotinic acid-2P4MHZ | 54.79 | 4.579 | Dispersion | Gray until 26th day, brown in 27 to 32 days | Solidification in 36 to 39 days |
| Comparative Example 7 | 2P4MHZ | 100 | 2.509 | Dispersion | White until 4th day, pink in 5 days | Solidification in 8 days |
| Comparative Example 8 | TEP-2P4MHZ | 48.58 | 5.165 | Dispersion | White | Solidification in 8 days |

TABLE 12

| | (Cases where (b2) was C11Im) | | | | | |
|---|---|---|---|---|---|---|
| | (b1) | Imidazole | Amount added to 10 | Appearance | | |
| | compound in catalyst sample | content (%) | g of epoxy | Initial stage | Color | Change over time |
| Example 49 | NIPA | 51.27 | 5.779 | Dispersion | White until 0th day, yellow in 1 day | Solidification in 4 days |
| 50 | HIPA | 54.93 | 5.393 | Dispersion | White | Solidification in 5 to 7 days |
| 51 | 3,5-Dihydroxybenzoic acid | 59.02 | 5.019 | Dispersion | White until 1st day, yellow in 2 days | Solidification in 3 days |
| 52 | Isophthalic acid | 57.20 | 5.180 | Dispersion | White | Solidification in 4 days |
| 53 | Pyromellitic acid | 46.62 | 6.354 | Dispersion | White | Solidification in 18 to 20 days |
| 54 | 1,4-Naphthalene dicarboxylic acid | 50.66 | 5.848 | Dispersion | White | Solidification in 4 days |
| 55 | Trimeric acid | 61.31 | 4.832 | Dispersion | White | Solidification in 5 to 7 days |
| 56 | Trimellitic acid | 51.37 | 5.767 | Dispersion | White | Solidification in 5 to 7 days |
| 57 | Malic acid | 62.34 | 4.752 | Dispersion | White | Solidification in 4 days |
| 58 | 3,5-Dihydroxy-2-naphthoic acid | 52.09 | 5.688 | Dispersion | Ocher | Solidification in 3 days |
| Comparison Example 9 | C11Im | 100 | 2.963 | Dispersion | White | Solidification in 2 days |

INDUSTRIAL APPLICABILITY

The present invention can provide liquid curable epoxy resin compositions (that is, a curable epoxy resin composition containing an organic solvent, and a liquid curable epoxy resin composition containing a liquid epoxy resin as a base resin) that have excellent storage stability and curing properties and provide a cured product having excellent properties, particularly, excellent organic solvent resistance. They can be preferably used for liquid paints, adhesives, sealing materials, casting agents, and electronic materials such as liquid sealants and the like.

The invention claimed is:

1. A liquid curable epoxy resin composition containing the following component (A) and component (B):

(A) an epoxy resin; and (B) a clathrate containing (b1) a pyridine derivative represented by formula (I):

(I)

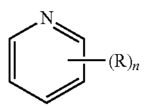

wherein R represents a hydroxy group, a nitro group, an alkyl group, an alkoxy group, an amino group, a sulfo group, an acetamide group, a hydrazine group, or a carboxyl group, and n represents an integer of 1 to 5; and when there are a plurality of R, R may be the same or different, and (b2) at least one selected from the group consisting of 1,8-diazabicyclo[5.4.0]undecene-7 and an imidazole compound represented by formula (II):

(II)

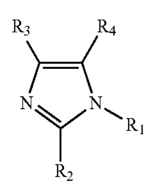

wherein $R_1$ represents a hydrogen atom, a C1-C10 alkyl group, an aryl group, an arylalkyl group, or a cyanoethyl group, and $R_2$ to $R_4$ each represent a hydrogen atom, a nitro group, a halogen atom, a C1-C20 alkyl group, a C1-C20 alkyl group substituted by a hydroxy group, an aryl group, an arylalkyl group, or a C1-C20 acyl group.

2. The curable epoxy resin composition according to claim 1, further containing an organic solvent.

3. The curable epoxy resin composition according to claim 2, wherein the organic solvent is a polar solvent.

4. The curable epoxy resin composition according to claim 2, wherein when methyl ethyl ketone is saturated with the clathrate of the component (B) at 25° C., a concentration of the component (b2) liberated in the methyl ethyl ketone is 5000 ppm or less.

5. The curable epoxy resin composition according to claim 4, wherein the organic solvent is a polar solvent.

6. The curable epoxy resin composition according to claim 1, wherein the epoxy resin is a liquid epoxy resin.

7. A curing agent or a curing accelerator for a liquid curable resin composition, containing the following clathrate (B):

(B) a clathrate containing (b1) a pyridine derivative represented by formula (I):

(I)

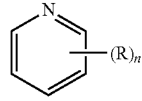

wherein R represents a hydroxy group, a nitro group, an alkyl group, an alkoxy group, an amino group, a sulfo group, an acetamide group, a hydrazine group, or a carboxyl group, and n represents an integer of 1 to 5; and when there are a plurality of R, R may be the same or different, and (b2) at least ne selected from the group consisting of 1,8-diazabicyclo[5.4.0]undecene-7 and an imidazole compound represented by formula (II):

(II)

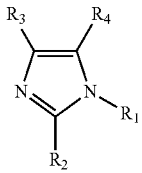

wherein $R_1$ represents a hydrogen atom, a C1-C10 alkyl group, an aryl group, an arylalkyl group, or a cyanoethyl group, and $R_2$ to $R_4$ each represent a hydrogen atom, a nitro group, a halogen atom, a C1-C20 alkyl group, a C1-C20 alkyl group substituted by a hydroxy group, an aryl group, an arylalkyl group, or a C1-C20 acyl group.

8. The curing agent or the curing accelerator according to claim 7, wherein the liquid curable resin composition comprises an organic solvent.

9. The curing agent or the curing accelerator according to claim 7, wherein the liquid curable resin composition comprises a liquid epoxy resin.

10. A clathrate containing:

(b1) a pyridine derivative represented by formula (I):

(I)

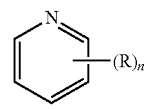

wherein R represents a hydroxy group, a nitro group, an alkyl group, an alkoxy group, an amino group, a sulfo group, an acetamide group, a hydrazine group, or a carboxyl group, and n represents an integer of 1 to 5; and when there are a plurality of R, R may be the same or different, and (b2) at least one selected from the group consisting of 1,8-diazabicyclo[5.4.0]undecene-7 and an imidazole compound represented by formula (II):

(II)

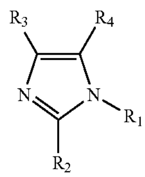

wherein $R_1$ represents a hydrogen atom, a C1-C10 alkyl group, an aryl group, an arylalkyl group, or a cyanoethyl group, and $R_2$ to $R_4$ each represent a hydrogen atom, a nitro group, a halogen atom, a C1-C20 alkyl group, a C1-C20 alkyl group substituted by a hydroxy group, an aryl group, an arylalkyl group, or a C1-C20 acyl group.

* * * * *

UNITED STATES PATENT AND TRADEMARK OFFICE

CERTIFICATE OF CORRECTION

PATENT NO. : 8,623,942 B2
APPLICATION NO. : 13/138568
DATED : January 7, 2014
INVENTOR(S) : Masami Kaneko et al.

It is certified that error appears in the above-identified patent and that said Letters Patent is hereby corrected as shown below:

In the Claims

Col. 31, claim 7, line 30, "(b2) at least ne selected" should be --(b2) at least one selected--.

Signed and Sealed this
Eighth Day of July, 2014

Michelle K. Lee
*Deputy Director of the United States Patent and Trademark Office*